(12) United States Patent
Katzman et al.

(10) Patent No.: US 6,302,540 B1
(45) Date of Patent: *Oct. 16, 2001

(54) METHOD FOR THE DESIGN OF MULTIFOCAL OPTICAL ELEMENTS

(75) Inventors: Dan Katzman, Givat Ela; Jacob Rubinstein, Misgav, both of (IL)

(73) Assignee: Shamir Optical Industries, Upper Galilee (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,341

(22) Filed: Mar. 4, 1999

(51) Int. Cl.[7] ....................................... G02C 7/06
(52) U.S. Cl. ............................. 351/161; 351/169
(58) Field of Search .................... 351/168, 169, 351/170, 171, 172, 177

(56) References Cited

U.S. PATENT DOCUMENTS 5,270,745 * 12/1993 Pedrono ............................... 351/169

* cited by examiner

Primary Examiner—Scott J. Sugarman
(74) Attorney, Agent, or Firm—Eitan, Pearl, Latzer & Cohen-Zedek

(57) ABSTRACT

A method for designing a surface of a multifocal optical element, such as a progressive spectacle lens, includes the steps of partitioning a region into triangles, defining a set of functions, each representing a portion of the surface over one of the triangles, and optimizing the functions. A further embodiment includes the steps of partitioning a region into polygons, and defining a set of functions, each representing a portion of the surface over one of the polygons. Continuity constraints for values of the functions and values of the first derivatives of the functions at boundaries of the polygons are dictated. Continuity constraints for values of the second derivatives of the functions at boundaries of the polygons are not required. The functions are optimized subject to the dictated continuity constraints. Another embodiment includes the steps of partitioning a region into polygons, and defining a set of functions, each representing a portion of the surface over one of the polygons. A plurality of curves along a subset of boundaries of the polygons is determined. Values of at least one of the set including the functions, first derivatives of the functions and second derivatives of the functions, or any combination therefrom, are prescribed at selected vertices of polygons coincident with the plurality of curves. The functions are optimized subject to the prescribed values.

34 Claims, 4 Drawing Sheets

METHOD FOR THE DESIGN OF MULTIFOCAL OPTICAL ELEMENTS

FIELD OF THE INVENTION

The present invention relates to a method for designing multifocal optical elements.

BACKGROUND OF THE INVENTION

Optical elements are pieces of substantially transparent material having surfaces that reflect or refract light, such as mirrors, lenses, splitters and collimators. Optical elements are used in a variety of applications, including telescopes, microscopes, cameras and spectacles.

Optical elements can be characterized by their optical properties and their surface optical properties. Optical properties such as astigmatism, optical power and prism describe how a wavefront of incident light is deformed as it passes through the optical element. Surface optical properties such as surface astigmatism, surface optical power and the gradients of the surface astigmatism and surface optical power describe geometrical properties of a surface of the optical element. The optical properties and the surface optical properties are closely related, but are not identical.

Multifocal optical elements have more than one optical power. For example, bifocal lenses have two subregions, each with a different optical power. Bifocal spectacle lenses can be used, for example, to correct myopia (short-sightedness) in one subregion, and presbyopia (the loss of the eye's ability to change the shape of its lens) in the other subregion. Unfortunately, many people find it uncomfortable to wear bifocal spectacle lenses, because of the abrupt change in optical power from one subregion to the other. This led to the development of progressive spectacle lenses, which are multifocal lenses in which the optical power varies smoothly from one point to another on the lens.

The surface optical power at any point on the surface of an optical element is defined by the mean curvature of the surface. A progressive lens has varying optical power, so it has variable curvature, and is by definition aspherical. However, since the surface of the progressive lens, or at least a substantial part of it, is by definition aspherical, it has two distinct principal curvatures $\kappa_1$ and $\kappa_2$ at many points. The surface astigmatism at any point on the surface of an optical element is defined by the absolute value of the difference in the principal curvatures $\kappa_1$ and $\kappa_2$.

The definitions of the mean curvature H, Gaussian curvature G, and principal curvatures $\kappa_1$ and $\kappa_2$ of a surface f at the point (x,y) are given in Equations 1A–1D:

$$H = \frac{1}{2} \frac{\left(1+\left(\frac{\partial f}{\partial x}\right)^2\right)\left(\frac{\partial^2 f}{\partial y^2}\right) - 2\left(\frac{\partial f}{\partial x}\right)\left(\frac{\partial f}{\partial y}\right)\left(\frac{\partial^2 f}{\partial x \partial y}\right) + \left(1+\left(\frac{\partial f}{\partial y}\right)^2\right)\left(\frac{\partial^2 f}{\partial x^2}\right)}{\left(1+\left(\frac{\partial f}{\partial x}\right)^2 + \left(\frac{\partial f}{\partial y}\right)^2\right)^{3/2}}, \quad (1A)$$

$$G = \frac{1}{2} \frac{\left(\frac{\partial^2 f}{\partial x^2}\right)\left(\frac{\partial^2 f}{\partial y^2}\right) - \left(\frac{\partial^2 f}{\partial x \partial y}\right)^2}{\left(1+\left(\frac{\partial f}{\partial x}\right)^2 + \left(\frac{\partial f}{\partial y}\right)^2\right)^2}, \quad (1B)$$

$$\kappa_1 = H + \sqrt{H^2 - G}, \quad (1C)$$

$$\kappa_2 = H - \sqrt{H^2 - G}, \quad (1D)$$

Since the early days of designing progressive lenses, the main design goals have been to achieve:

a) gently varying optical power;
b) minimal astigmatism;
c) reduction of a variety of optical aberrations such as skew distortion, binocular imbalance, etc.

Many different methods have been proposed to achieve these goals. U.S. Pat. No. 3,687,528 to Maitenaz describes a technique in which a base curve (meridian) runs from the upper part of the lens to its lower part. The lens surface is defined along the meridian such that the curvature varies gradually (and hence the optical power varies). Along the meridian itself, the principal curvatures $\kappa_1$ and $\kappa_2$ satisfy $\kappa_1 = \kappa_2$. The lens surface is extended from the meridian horizontally in several different methods. Explicit formulas are given for the extensions from the meridian. Maitenaz obtains an area in the upper part of the lens, and another area in the lower part of the lens in which there is a rather stable optical power. Furthermore, the astigmatism in the vicinity of the meridian is relatively small.

Many designs for progressive lenses explicitly divide the progressive lens into three zones: an upper zone for far vision, a lower zone for near vision, and an intermediate zone that bridges the first two zones. The upper and lower zones provide essentially clear vision. Many designs use spherical surfaces for the upper and lower zones. A major effort in the design process is to determine a good intermediate zone.

U.S. Pat. No. 4,315,673 to Guilino and U.S. Pat. No. 4,861,153 to Winthrop describe a method which achieves a smooth transition area through the use of explicit formula for the intermediate zone. U.S. Pat. No. 4,606,622 to Furter and G. Furter, "Zeiss Gradal HS—The progressive addition lens with maximum wearing comfort", *Zeiss Information* 97, 55–59, 1986, describe a method in which the lens designer defines the value of the lens surface in the intermediate zone at a number of special points. The full surface is then generated by the method of splines. The designer adjusts the value of the lens surface at the special points in order to improve the properties of the generated surface.

U.S. Pat. No. 4,838,675 to Barkan et al. describes yet another method. A progressive lens having an upper zone for far vision, a lower zone for near vision, and an intermediate zone is described by a base surface function. An improved progressive lens is calculated by optimizing a function defined over a subregion of the lens, where the optimized function is to be added to the base surface function.

A different technique is described by J. Loos, G. Greiner and H. P. Seidel, "A variational approach to progressive lens design", *Computer Aided Design* 30, 595–602, 1998 and by M. Tazeroualti, "Designing a progressive lens", in the book edited by P. J. Laurent et al., *Curves and Surfaces in Geometric Design*, AK Peters, 1994, pp. 467–474. The lens surface is defined as a combination of spline functions, and therefore the surface must be considered over a rectangle which is divided into smaller rectangles. This method is unnatural for those lenses which need to be defined over a shape other than a rectangle. A cost function is defined, and the spline coefficients are determined such that the surface minimizes the cost function. This method does not impose boundary conditions on the surface, and therefore lenses requiring a specific shape at the boundary cannot be designed using this method. Using cubic bisplines, this method provides an accuracy of $h^4$, where h is the ratio of the diagonal of the smaller rectangle to the diagonal of the large rectangle.

European Patent Application EP744646 to Kaga et al. describes a method in which the surface of a progressive lens is partitioned into rectangles. At the boundaries of the rectangles, the surface must be continuous, differentiably continuous and twice differentiably continuous. Since optical power is related to curvature, and the curvatures are determined by the second derivatives of the surface, it seems natural to impose continuity constraints on the second derivatives. In fact, many method for designing progressive lens include continuity constraints on the second derivatives of the lens surface.

SUMMARY OF THE INVENTION

An object of the present invention is to provide a novel method for designing multifocal optical elements.

There is therefore provided in accordance with a preferred embodiment of the present invention a method for designing a surface of a multifocal optical element. The method includes the steps of partitioning a region into triangles, defining a set of functions, each of which represents a portion of the surface over one of the triangles, and optimizing the functions, thereby generating the surface.

Moreover, in accordance with a preferred embodiment of the present invention, the optical element is a lens.

Furthermore, in accordance with a preferred embodiment of the present invention, the lens is a progressive spectacle lens.

In addition, in accordance with a preferred embodiment of the present invention, the region is a two-dimensional region and the functions are fifth-order polynomials in the two dimensions.

Moreover, in accordance with a preferred embodiment of the present invention, the method also includes the steps of simulating optical behavior of the optical element based upon the generated surface, and if the generated surface is unsatisfactory, adjusting parameter values of the functions and repeating the steps of optimizing and simulating.

Furthermore, in accordance with a preferred embodiment of the present invention, the step of optimizing further includes the steps of defining a function of the set of functions and optimizing the function.

In addition, in accordance with a preferred embodiment of the present invention, the the function is a cost function and the step of optimizing the function is the step of minimizing the function.

Moreover, in accordance with a preferred embodiment of the present invention, the method further includes the step of choosing weights to be included in the function.

Furthermore, in accordance with a preferred embodiment of the present invention, the weights vary according to at least one of location on the surface, the set of functions and first derivatives of the set of functions.

There is also provided in accordance with a further preferred embodiment of the present invention a method for designing a surface of a multifocal optical element. The method includes the steps of partitioning a region into polygons, and defining a set of functions, each of which represents a portion of the surface over one of the polygons. Continuity constraints for values of the functions and values of the first derivatives of the functions are dictated at boundaries of the polygons. Continuity constraints for values of the second derivatives of the functions at boundaries of the polygons are not required. The functions are optimized subject to the dictated continuity constraints, thereby generating the surface.

Moreover, in accordance with a preferred embodiment of the present invention, the method also includes the step of dictating continuity constraints for values of the second derivatives of the functions at vertices of the polygons.

Furthermore, in accordance with a preferred embodiment of the present invention, the polygons are triangles.

There is also provided in accordance with another preferred embodiment of the present invention a method for designing a surface of a multifocal optical element. The method includes the steps of partitioning a region into polygons and defining a set of functions, each of which represents a portion of the surface over one of the polygons. A plurality of curves is determined along a subset of boundaries of the polygons. Values of at least one of the set comprising the functions, first derivatives of the functions and second derivatives of the functions, or any combination therefrom, are prescribed at selected vertices of polygons coincident with the plurality of curves. The functions are optimized subject to the prescribed values, thereby generating the surface.

Moreover, in accordance with a preferred embodiment of the present invention, the polygons are triangles.

Furthermore, in accordance with a preferred embodiment of the present invention, the polygons are rectangles.

There is also provided in accordance with a preferred embodiment of the present invention, a multifocal optical element having a plurality of surfaces, where at least one of the surfaces is designed by one of the methods described hereinabove.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is a novel method for designing multifocal optical elements. The method enables the designer to emphasize specific areas of a surface of the optical element where a desired optical behavior is more crucial. The method also enables the designer to control optical properties along and in the vicinity of curves on the surface.

In the particular case of designing a progressive lens, the present invention does not require the division of the lens into three zones: an upper zone for far vision, a lower zone for near vision, and an intermediate zone that bridges the first two zones. Rather, the entire lens surface is optimized as a whole.

Figure 1:
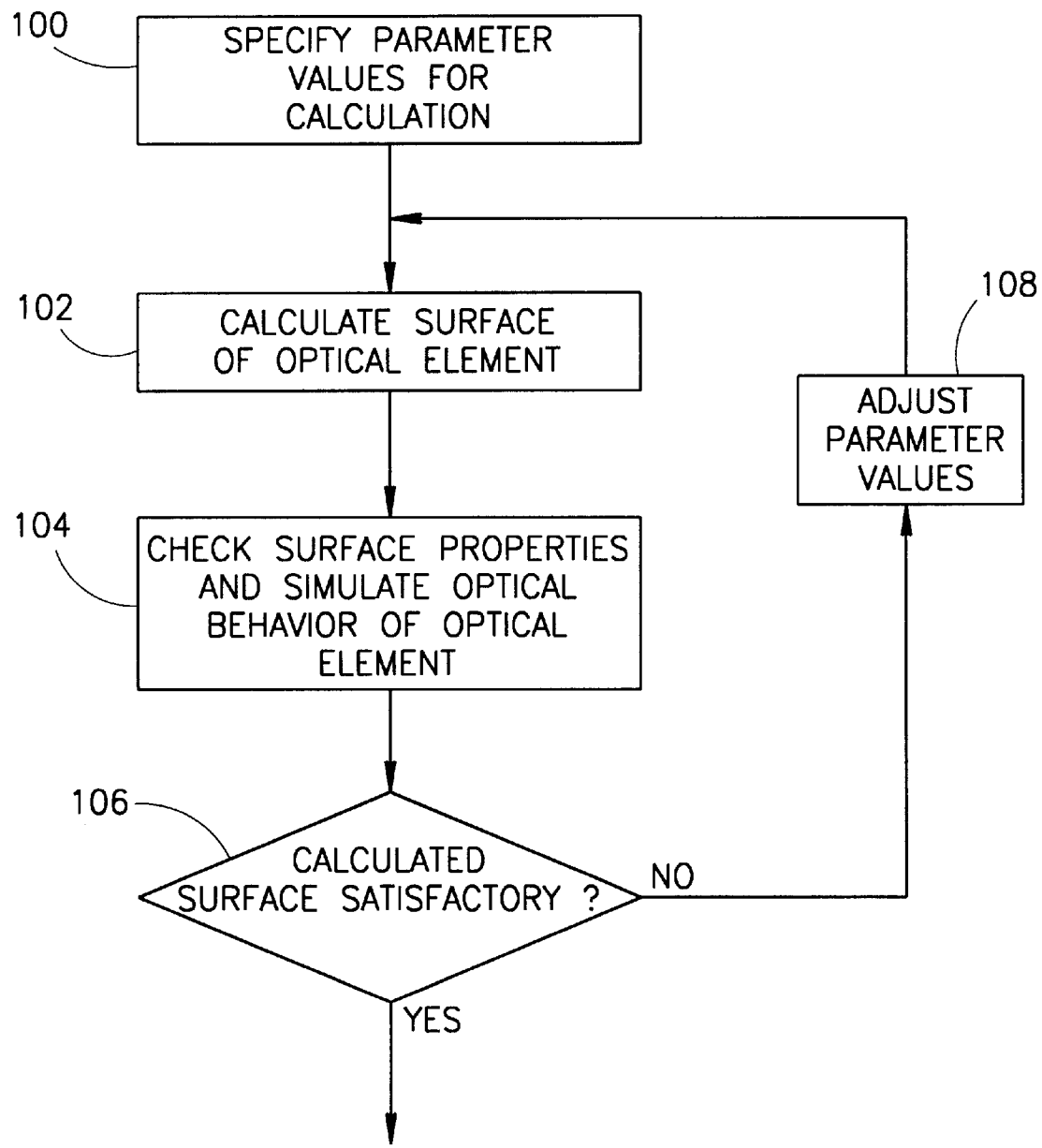
FIG. 1 is a schematic flowchart illustration of a design process for a surface of an optical element, in accordance with a preferred embodiment of the present invention.

The method of the present invention involves a design process with feedback. This is shown in FIG. 1, to which reference is now made. The designer specifies (step 100) the values of various parameters to be used in the design process. Then the parameter values are used to calculate (step 102) the surface. In step 104, the designer evaluates the surface resulting from the calculation of step 102. The designer checks whether the surface optical properties are satisfactory. The surface optical properties include the surface optical power, defined as the mean curvature of the surface, the surface astigmatism, defined as the absolute value of the difference between the principal curvatures of the surface, and the gradients of the surface optical power and surface astigmatism. In addition, the designer uses a simulator to simulate the passage of at least one wavefront through the optical element, resulting in the determination of optical properties of the optical element. If the calculated surface is unsatisfactory (step 106), the designer adjusts (step 108) the values of the various parameters. Then the surface is recalculated (step 102). This process is repeated until the designer is satisfied with the calculated surface.

Figure 2:
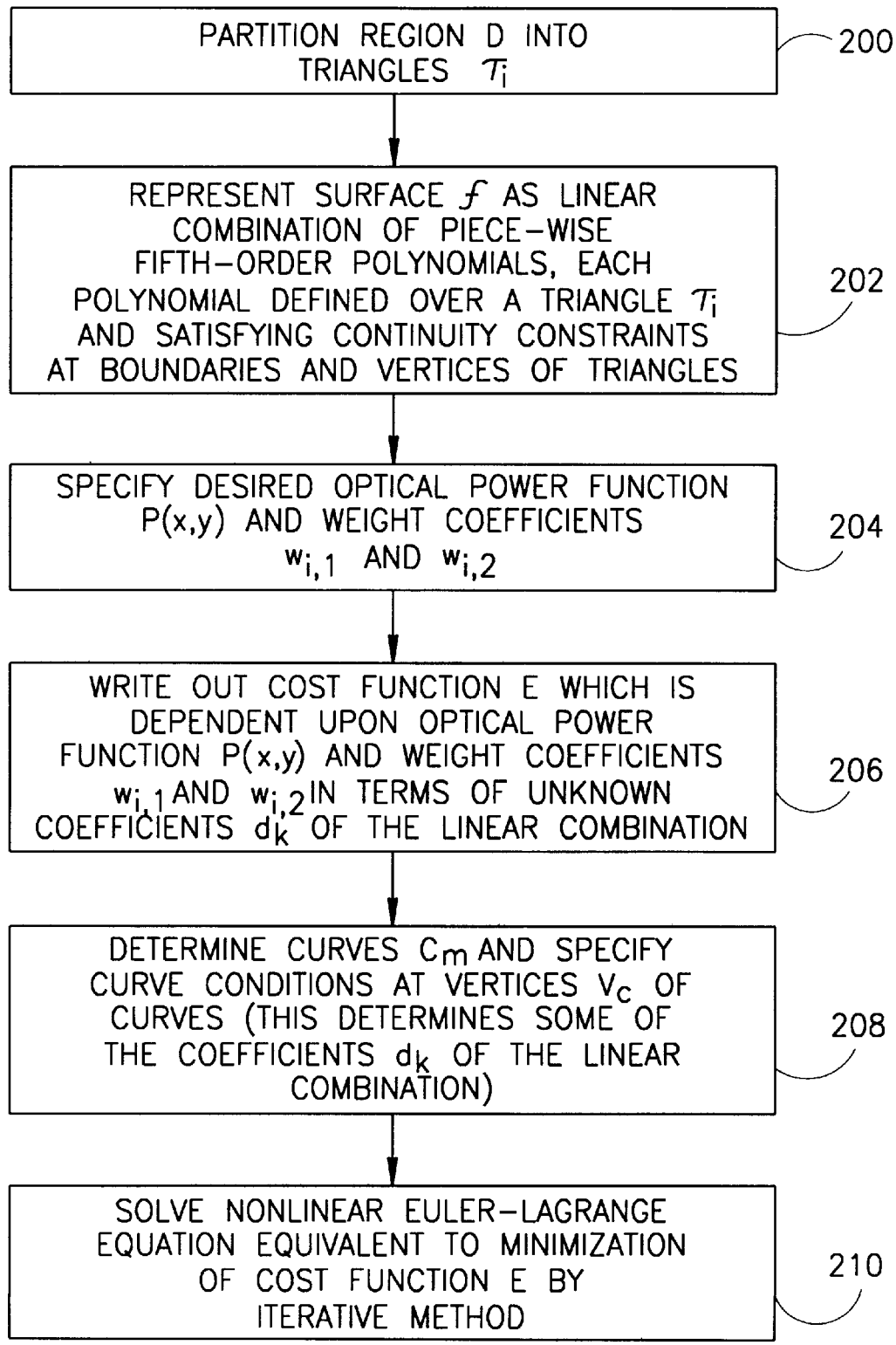
FIG. 2 is a schematic flowchart illustration of a portion of the design process shown in FIG. 1, in accordance with a preferred embodiment of the present invention.

The specification of parameter values (step 100) and calculation of the surface (step 102) are shown in greater detail in FIG. 2, to which reference is now made, which is a schematic flowchart illustration of a portion of the design process.

Figure 3:
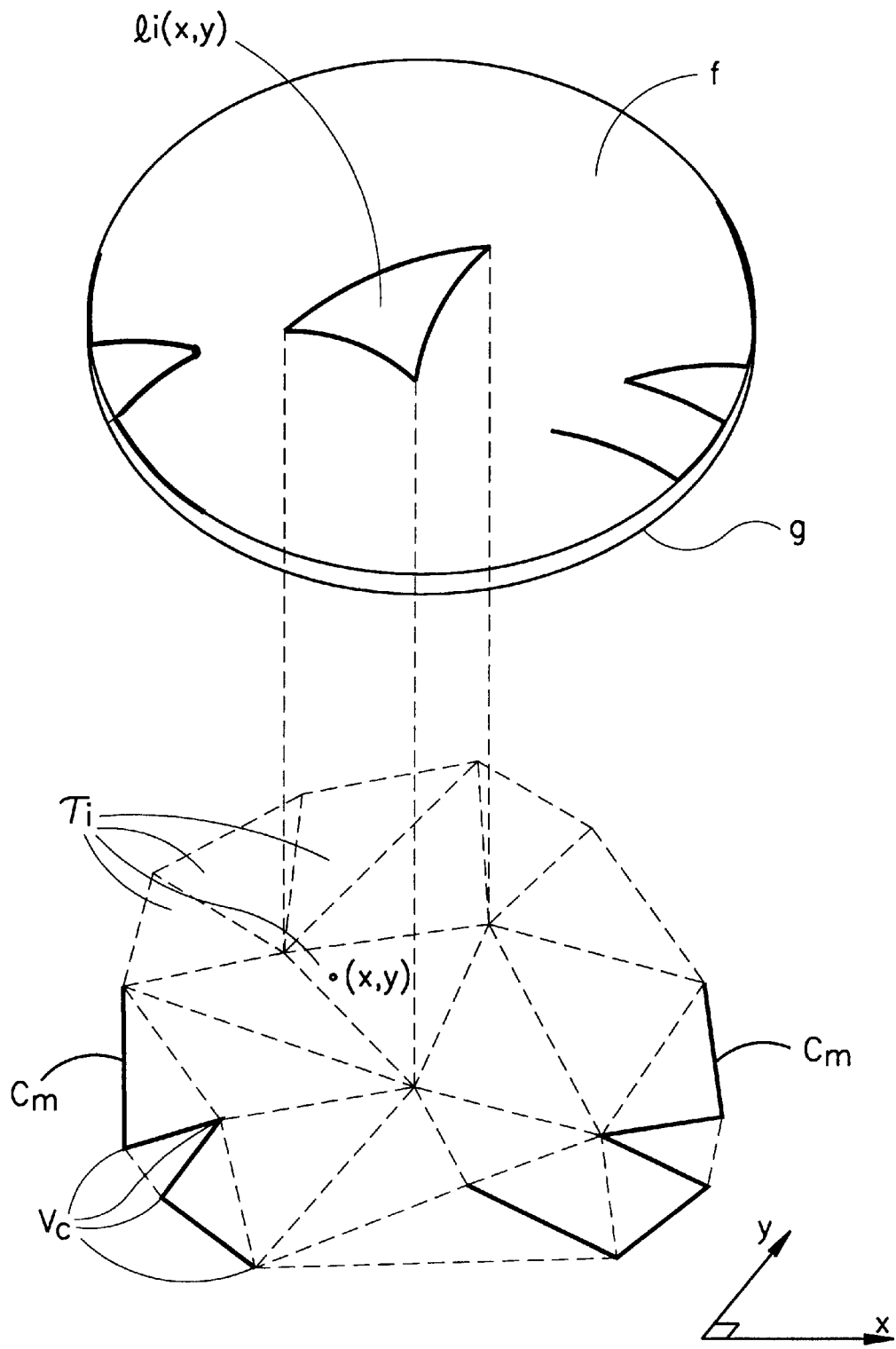
FIG. 3 is a schematic illustration of a representation of a lens surface, in accordance with a preferred embodiment of the present invention.

Reference is made additionally to FIG. 3, which is a schematic illustration of a lens. The lens has a known surface g, and an unknown surface f. The lens surface f is considered over a region D in the (x,y) plane. The region D is partitioned (step 200) into a collection of polygons. In a preferred embodiment of the present invention, the polygons are triangles $\tau_i$, i=1, . . . , N, where N is the total number of triangles. The number of triangles is not limited, and the triangles need not be identical to one other, thus providing the flexibility needed to partition a region D of arbitrary shape.

The surface f is a patch of a plurality of small "lenslets" $l_i$, where each lenslet $l_i$ is defined over one triangle $\tau_i$. The height of the surface f above the point (x,y) in the triangle $\tau_i$ is given by $l_i(x,y)$ as expressed in Equation 2:

$$f(x,y)=l_i(x,y),\ (x,y)\in \tau_i. \tag{2}$$

Since the triangles need not be identical to one another, small lenslets may be used for those areas of the lens surface where fine detail is required, and large lenslets may be used for those areas of the lens surface where coarse detail is sufficient.

The surface of each lenslet $l_i$ is represented (step 202) over its triangle $\tau_i$ by a fifth order polynomial, namely a polynomial in x and y that includes all combinations of the form $x^j y^m$ with j+m less than or equal to 5. The height of the surface of a lenslet $l_i$ above the point (x,y) in the triangle $\tau_i$ is given by $l_i(x,y)$ in Equation 3:

$$\begin{aligned}l_i(x,y) = & a_i^{00} + a_i^{10}x + a_i^{01}y + a_i^{20}x^2 + a_i^{11}xy + a_i^{02}y^2 + a_i^{30}x^3 + \\ & a_i^{21}x^2y + a_i^{12}xy^2 + a_i^{03}y^3 + a_i^{40}x^4 + a_i^{31}x^3y + a_i^{22}x^2y^2 + a_i^{13}xy^3 + \\ & a_i^{04}y^4 + a_i^{50}x^5 + a_i^{41}x^4y + a_i^{32}x^3y^2 + a_i^{23}x^2y^3 + a_i^{14}xy^4 + a_i^{05}y^5\end{aligned} \tag{3}$$

Equation 3 can be rewritten more compactly as in Equation 4:

$$l_i(x,y) = \sum_{\substack{j,m \\ j+m\leq 5}} a_i^{jm} x^j y^m,\ (x,y)\in \tau_i, \tag{4}$$

where $a_i^{jm}$ are the coefficients of the ith lenslet $l_i$. The surface f is therefore fully determined by the coefficients $a_i^{jm}$ of the set of local polynomials.

It will be appreciated that if there are, for example, 1000 triangles in the partition of the region D, then the determination of the surface f involves determining the value of 21,000 coefficients. Without additional constraints, there are infinitely many possible solutions for the surface f.

As explained hereinabove, the most natural constraint is that the lenslet surfaces $l_i$ are patched together so that the resulting surface f is continuous, differentiably continuous and twice differentiably continuous along the boundaries of the triangles $\tau_i$. Since the second derivative of f is the curvature, which is related to the optical power, and the optical power should vary smoothly, it is natural to demand that the surface f be twice differentiably continuous along the boundaries.

An important feature of the present invention is that it is sufficient to require that the lenslet surfaces $l_i$ are patched together so that the resulting surface f is continuous and differentiably continuous along the boundaries of the triangles $\tau_i$. This is expressed in Equations 5A–5C:

$$l_i(x,y) = l_j(x,y),\ (x,y)\in \tau_i \cap \tau_j, \tag{5A}$$

$$\frac{\partial l_i(x,y)}{\partial x} = \frac{\partial l_j(x,y)}{\partial x},\ (x,y)\in \tau_i \cap \tau_j, \tag{5B}$$

$$\frac{\partial l_i(x,y)}{\partial y} = \frac{\partial l_j(x,y)}{\partial y},\ (x,y)\in \tau_i \cap \tau_j, \tag{5C}$$

where the intersection of the triangles $\tau_i$ and $\tau_j$ is the boundary common to both triangles.

According to an alternative preferred embodiment of the present invention, the requirement that the lenslet surfaces $l_i$ are patched together so that the resulting surface f is twice differentiably continuous at the vertices of the triangles $\tau_i$ is added to the continuity constraints of Equations 5A–5C. This is expressed in Equations 5D–5F:

$$\frac{\partial^2 l_i(x,y)}{\partial x^2} = \frac{\partial^2 l_j(x,y)}{\partial x^2} = \frac{\partial^2 l_k(x,y)}{\partial x^2},\ (x,y)\in \tau_i \cap \tau_j \cap \tau_k, \tag{5D}$$

$$\frac{\partial^2 l_i(x,y)}{\partial x \partial y} = \frac{\partial^2 l_j(x,y)}{\partial x \partial y} = \frac{\partial^2 l_k(x,y)}{\partial x \partial y},\ (x,y)\in \tau_i \cap \tau_j \cap \tau_k, \tag{5E}$$

$$\frac{\partial^2 l_i(x,y)}{\partial y^2} = \frac{\partial^2 l_j(x,y)}{\partial y^2} = \frac{\partial^2 l_k(x,y)}{\partial y^2},\ (x,y)\in \tau_i \cap \tau_j \cap \tau_k, \tag{5F}$$

where the intersection of the triangles $\tau_i$ and $\tau_j$ and $\tau_k$ is the vertex common to the three triangles. It will be appreciated that in certain extreme cases, where a vertex is common only to two triangles, the continuity constraints of Equations 5D–5F still hold at those vertices. It will be appreciated that the continuity constraints of Equations 5D–5F are significantly less restrictive than the prior art continuity constraints for the second derivative which are given along the entire boundaries.

Since the goal is a progressive lens with varying optical power, it is reasonable to constrain the surface f so that its mean curvature matches as much as possible a predetermined function P(x, y) that specifies (step 204) the desired optical power at each point (x,y). Furthermore, since another goal is to minimize the astigmatism of the progressive lens, it is reasonable to constrain the surface f so that the difference between its principal curvatures is minimized. Moreover, as mentioned hereinabove, the designer may wish to emphasize specific areas of the lens surface. This is accomplished by choosing (step 204) weight coefficients $w_{i,1}$ and $w_{i,2}$ that characterize the relative "strength" of each lenslet $l_i$, and the relative importance of the astigmatism and the optical power for each lenslet $l_i$. The weight coefficients of an emphasized lenslet will be greater than the weight coefficients of a de-emphasized lenslet. For a particular lenslet $l_i$ in which the optical power is more important than the astigmatism, the weight coefficient $w_{i,2}$ will be greater than the weight coefficient $w_{i,1}$. Similarly, for a particular lenslet $l_i$ in which the astigmatism is more important than the optical power, the weight coefficient $w_{i,1}$ will be greater than the weight coefficient $w_{i,2}$.

Therefore, subject to the constraints of Equations 5A–5F, the coefficients $a_i^{jm}$ representing the surface f must minimize a cost function E given in Equation 6:

$$E = \sum_{i=1}^{N} \int_{\tau_i} w_{i,1} (\kappa_1(x, y) - \kappa_2(x, y))^2 + w_{i,2} \left( \frac{\kappa_1(x, y) + \kappa_2(x, y)}{2} - P(x, y) \right)^2 dx\, dy, \quad (6)$$

where $\kappa_1(x,y)$ and $\kappa_2(x,y)$ are the principal curvatures of the surface f at the point (x,y), and dxdy is a surface area element of the triangle $\tau_i$. The predetermined weight coefficients $w_{i,1}$ and $w_{i,2}$ depend upon x, y, and possibly upon f and the first derivatives of f. This dependence upon f and the first derivatives of f can arise from a number of situations. For example, if the integral is computed not over the triangle $\tau_i$ but over the surface of the lenslet $l_i$, then the surface area element dxdy is replaced by $$\sqrt{1 + (\partial f / \partial x)^2 + (\partial f / \partial y)^2}\, dx\, dy.$$

dxdy. The factor $$\sqrt{1 + (\partial f / \partial x)^2 + (\partial f / \partial y)^2}$$

can be absorbed into the weight coefficients, leaving the surface area element as dxdy. The factor $$\sqrt{1 + (\partial f / \partial x)^2 + (\partial f / \partial y)^2}$$

effectively increases the weight of lenslets whose surface area is large relative to other lenslets, perhaps to account for the fact that more light passes through large lenslets. Another example of weight coefficients that are dependent upon f and the first derivatives of f is when the designer wants to penalize abrupt changes in the surface f.

The surface f which minimizes the cost function E will not necessarily have the optical power P(x,y) at the point (x,y). If the designer wishes to force the lens to have a particular shape and/or optical behavior at certain points, then the designer determines (step 208) a finite set of curves $C_m$, $m=1, \ldots, N_C$, where $N_C$ is the total number of curves, along a subset of the boundaries of the triangles $\tau_i$. The designer specifies (step 208) curve conditions, which dictate any or some of the values of the surface f and its first and second derivatives at the vertices $V_C$ of the curves $C_m$. This has the effect of controlling the shape and optical properties at the vertices $V_C$ and in the vicinity of the curves $C_m$. It will be appreciated that the curves $C_m$ do not necessarily define an enclosed subregion on the surface.

According to a well-known technique from the art of plate mechanics, the surface f can be expressed as a patch of fifth-order polynomials defined over the triangles $\tau_i$, such that the surface f will satisfy the continuity constraints of Equations 5A–5F. This technique is described in the article "The TUBA Family of Plate Elements for the Matrix Displacement Method" by J. H. Argyris, I. Fried and D. W. Scharpf, published in *The Aeronautical Journal*, 1968, vol. 72, pp. 701–709, which is incorporated herein by reference. A number $N_S$ of fifth-order shape polynomials $S_k(x,y)$ that satisfy the continuity constraints of Equations 5A–5F are constructed. According to a preferred embodiment of the present invention, the surface f is represented (step 202) as a linear combination of these shape polynomials $S_k(x, y)$, as given in Equation 7:

$$f(x, y) = \sum_{k=1}^{N_S} d_k S_k(x, y), \quad (7)$$

where $d_k$ are the unknown coefficients in the linear combination. Then, by construction, the surface f of Equation 7 satisfies the continuity constraints of Equations 5A–5F. As will be explained hereinbelow, the curve constraints prescribed by the designer effectively determine the value of some of the unknown coefficients $d_k$. When the surface f of Equation 7 is substituted into the cost function E of Equation 6, the result is an expression (step 206) of the cost function E in terms of the coefficients $d_k$, some of which are unknown. The minimization of the cost function E can now be performed without regard for the continuity constraints of Equations 5A–5F and the curve constraints, in order to determine the remaining unknown coefficients $d_k$.

As mentioned in the article by Argyris et al., the continuity constraints of Equations 5A–5F are equivalent to satisfying continuity of f, its first derivatives and its second derivatives at the vertices of the triangles $\tau_i$, and continuity of the derivative of f with respect to the normal at the midpoints of the sides of the triangles $\tau_i$. Therefore, for the entire set of triangles $\tau_i$, the continuity constraints of Equations 5A–5F are equivalent to 6 continuity constraints for each vertex and 1 continuity constraint for each midpoint. The exact 6 values of f, its first derivatives and its second derivatives at the each vertex and the exact value of the derivative of f with respect to the normal at each midpoint are free parameters, known as degrees of freedom.

It will be appreciated that the number of vertices $N_V$ in the set of triangles is less than 3 times the number of triangles N, since many vertices are common to more than one triangle. It will also be appreciated that the number of midpoints $N_M$ in the set of triangles is less than 3 times the number of triangles N, since most midpoints are common to two triangles. The total number of degrees of freedom for the entire set of triangles $\tau_i$ is given in Equation 8:

$$N_S = 6N_V + N_M. \quad (8)$$

Figure 4:
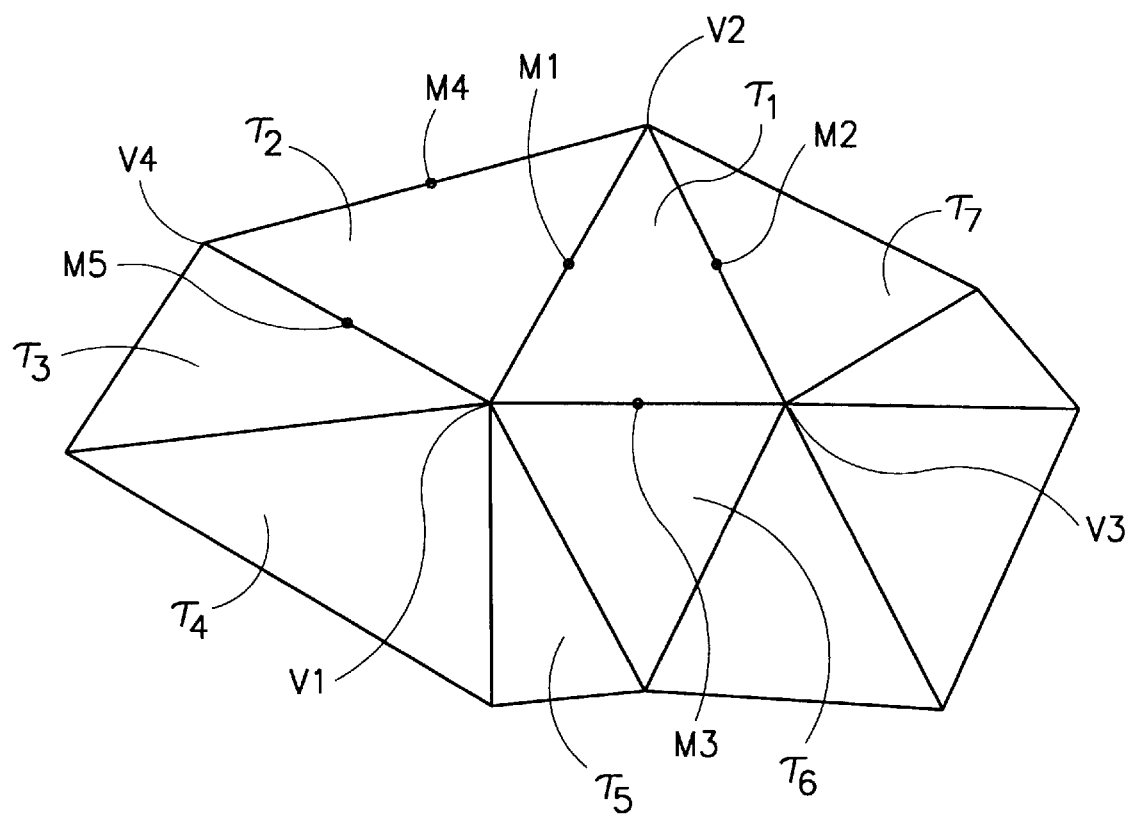
FIG. 4 is a schematic illustration of a region partitioned into triangles, helpful in understanding the present invention.

A shape polynomial $S_k(x, y)$ is constructed for each degree of freedom, as shown in FIG. 4, to which reference is additionally made, which is a schematic illustration of a region partitioned into triangles. A triangle $\tau_1$ has three vertices V1, V2 and V3 and three midpoints M1, M2 and M3. A triangle $\tau_2$ has three vertices V1, V2 and V4 and three midpoints M1, M4 and M5. Vertex V1 is common to six triangles, $\tau_1$–$\tau_6$. Midpoint M1 is common to triangles $\tau_1$ and $\tau_2$ midpoint M2 is common to triangles $\tau_1$ and $\tau_7$, and midpoint M3 is common to triangles $\tau_1$ and $\tau_6$.

One of the $N_S$ degrees of freedom is related to the value of the surface f at the vertex V1. A shape polynomial $S_1(x, y)$ is constructed so that its value at vertex V1 is 1 and at every other vertex in the set of triangles is 0, its first and second derivatives at every vertex are 0, and its derivative with respect to the normal at every midpoint is 0. This is accomplished by determining a fifth-order polynomial in each triangle, and setting $S_1(x,y)$ to be the piece-wise collection of these fifth-order polynomials. The triangle $\tau_1$ has 21 degrees of freedom associated with it—the value of f, its first derivatives and its second derivatives at each of the vertices V1, V2 and V3, and the value of the derivative of f with respect to the normal at each of the midpoints M1, M2 and M3. Therefore, a fifth-order polynomial in x and y, having 21 coefficients, can be fully determined for triangle $\tau_1$ by setting the value at vertex V1 to 1, the value at vertices V2 and V3 to 0, the first and second derivatives at vertices V1, V2 and V3 to 0, and the derivative with respect to the normal at midpoints M1, M2 and M3 to 0. Similarly, a fifth-order polynomial in x and y can be fully determined for triangle $\tau_2$ by setting the value at vertex V1 to 1, the value at vertices V2 and V4 to 0, the first and second derivatives at vertices V1, V2 and V4 to 0, and the derivative with respect to the normal at midpoints M1, M4 and M5 to 0. It will be appreciated that the fifth-order polynomial for triangle $\tau_1$ and the fifth-order polynomial for triangle $\tau_2$ satisfy the continuity constraints of Equations 5A–5F. Similar fifth-order polynomials in x and y are fully determined for the remaining triangles in the set, and the shape polynomial $S_1(x, y)$ is defined as the piece-wise collection of these fifth-order polynomials.

Similarly, a second shape polynomial $S_2(x,y)$ is constructed so that its value at every vertex is 0, its first derivative at vertex V1 is 1 and at every other vertex is 0, its second derivatives at every vertex are 0, and its derivative with respect to the normal at every midpoint is 0.

It will be appreciated that each of the shape polynomials $S_k(x,y)$ satisfies the continuity constraints of Equations 5A–5F by construction, and therefore the linear combination given in Equation 7 satisfies them as well.

It will also be appreciated that each of the fifth-order shape polynomials $S_k(x,y)$ is non-zero only in those triangles where a degree of freedom is 1 at a vertex or midpoint of that triangle.

The curve constraints specified by the designer are prescribed values for f and possibly some of its first and second derivatives at the vertices $V_C$ of the curves $C_m$. Each of these curve constraints fixes the value for f or one of its first or second derivatives at a particular vertex in the set of triangles, and therefore fully determines (step 208) the value of a particular $d_k$ appearing in the linear combination of Equation 7. The number of coefficients $d_k$ that remain unknown is given by the expression $N_S$—number of curve constraints.

Other techniques for constructing fifth-order shape polynomials that satisfy the continuity constraints of Equations 5A–5F are known from the art of plate mechanics. For example, such a technique is described in the article "Static and Dynamic Applications of a High-Precision Triangular Plate Bending Element" by G. R. Cowper, E. Kosko, G. M. Lindberg and M. D. Olson, published in *AIAA Journal,* 1969, vol. 7, no. 10, pp. 1957–1965, which is incorporated herein by reference.

The shape polynomials according to Argyris provide an accuracy of $h^6$, while the shape polynomials according to Cowper provide an accuracy of $h_5$, where h is the ratio of one edge of a triangle to one dimension of the region D.

It will be appreciated that any fifth-order polynomials satisfying the continuity constraints of Equations 5A–5F can be used as the basis of a linear combination for f instead of the shape functions described hereinabove.

It will be appreciated that if polygons other than triangles are used to partition the region D, the number of degrees of freedom associated with the polygon will be greater than 21, and therefore the polynomials will have to be higher than fifth-order in order to account for all the degrees of freedom.

As mentioned above, the linear combination of Equation 7 is substituted into the cost function E of Equation 6, and the result is an expression of the cost function E in terms of the coefficients $d_k$, some of which are unknown. The minimization of the cost function E is now performed (step 210) without regard for the continuity constraints of Equations 5A–5F and the curve constraints, in order to determine the remaining unknown coefficients $d_k$. It is well known from the calculus of variations that the minimization problem is equivalent to solving a particular equation, known as the Euler-Lagrange equation, for the unknown surface f. This is explained in the book *Calculus of Variations,* by I. M. Gelfand and S. V. Fomin, Prentice Hall, 1963.

For the cost function E given in Equation 6, the Euler-Lagrange equation is nonlinear. Furthermore, the integral over the triangle $\tau_i$ contains a nonlinear expression in the unknown coefficients $d_k$, and therefore is difficult to compute explicitly. Therefore, an iterative method is used to solve (step 210) the Euler-Lagrange equation for the unknown coefficients $d_k$. In a preferred embodiment of the present invention, the Newton method is used, but any other suitable iterative method can be used instead.

The iterative method consists of producing a sequence of surfaces, $f_1, f_2, \ldots$, such that the sequence converges to the required solution f. There are many ways to choose the initial surface $f_1$ for the iteration. For example, a plane in x and y can be chosen for the initial surface $f_1$. Each surface in the sequence solves a system of linear algebraic equations, the system characterized by a matrix. The construction of the matrices appearing in the iteration method is described in the finite elements literature, for example, in the books by T. J. R. Hughes, *The Finite Elements Method,* Prentice Hall, 1987, and by W. G. Strang and G. Fix, *An Analysis to the Finite Element Method,* Wellesley Cambridge, 1973, which are incorporated herein by reference.

A benefit of using the Finite Elements Method is that the matrices used in the iteration process have a special structure, in which all elements of the matrix except for a narrow band near the diagonal are zero. Such matrices are known as "band matrices". This feature greatly reduces the computational complexity of solving the system of equations, and therefore enables the use of very many degrees of freedom when representing the lens surface.

In principle, there are infinitely many steps to the iteration process. Therefore, it is necessary to determine a criterion for stopping the iteration process at a particular point, and using the resulting surface as the solution. One example of such a criterion is to compare a surface $f_M$ to the previous surface $f_{M-1}$. One example of such a comparison is to take the difference of the linear combination coefficients $d_k$ for surface $f_M$ and surface $f_{M-1}$. If the sum of squares of this difference is less than a predetermined threshold, then the sequence is said to have converged to the surface $f_M$.

The designer may find that the convergence to a solution is too slow, for example, that the difference between a surface $f_M$ and the previous surface $f_{M-1}$ is too big. According to a preferred embodiment of the present invention, the convergence of the sequence of surfaces can be enhanced by replacing the cost function E given in Equation 6 by a variant cost function E' for one or more steps in the iteration, before returning to the original problem. The variant cost function E' is the cost function E of Equation 6 with the principal curvatures $\kappa_1$ and $\kappa_2$ of Equations 1C and 1D, respectively, replaced by $\kappa_1'$ and $\kappa_2'$ as given in Equations 9C and 9D, respectively:

surface may change too rapidly, and cause discomfort for the wearer of a lens based upon the calculated surface.

According to a preferred embodiment of the present invention, the simulation simulates the optical properties of the lens as seen from an eye. One or more wavefronts are propagated towards the lens. In a preferred embodiment of the present invention, a plurality of spherical wavefronts is propagated towards the lens. Generally, the wavefronts are deformed as they pass through the lens. The resulting deformed wavefronts on the other side of the lens can be characterized by a variety of properties, including astigmatism, optical power, prism, and the like. The calculation of the deformed wavefronts can be accomplished by the well-known technique of ray-tracing. The article "Testing and centering of lenses by means of a Hartmann test with four holes" by D. Malacara and Z. Malacara, published in *Optical Engineering*, 1992, vol. 31 no. 7, pp. 1551–1555, describes a technique to determine the properties of the deformed wavefronts.

It will be appreciated by persons skilled in the art that the present invention is not limited by what has been particu- $$H'(\beta) = \frac{1}{2} \frac{\left(1+\beta\left(\frac{\partial f}{\partial x}\right)^2\right)\left(\frac{\partial f}{\partial y^2}\right) - 2\beta\left(\frac{\partial f}{\partial x}\right)\left(\frac{\partial f}{\partial y}\right)\left(\frac{\partial^2 f}{\partial x \partial y}\right) + \left(1+\beta\left(\frac{\partial f}{\partial y}\right)^2\right)\left(\frac{\partial^2 f}{\partial x^2}\right)}{\left(1+\beta\left(\frac{\partial f}{\partial x}\right)^2 + \beta\left(\frac{\partial f}{\partial y}\right)^2\right)^{3/2}}, \quad (9A)$$

$$G'(\beta) = \frac{1}{2} \frac{\left(\frac{\partial^2 f}{\partial x^2}\right)\left(\frac{\partial^2 f}{\partial y^2}\right) - \left(\frac{\partial^2 f}{\partial x \partial y}\right)^2}{\left(1+\beta\left(\frac{\partial f}{\partial x}\right)^2 + \beta\left(\frac{\partial f}{\partial y}\right)^2\right)^2} \quad (9B)$$

$$\kappa_1'(\beta) = H'(\beta) + \sqrt{H'(\beta)^2 - G'(\beta)}, \quad (9C)$$

$$\kappa_2'(\beta) = H'(\beta) - \sqrt{H'(\beta)^2 - G'(\beta)}. \quad (9D)$$

It will be appreciated that when $\beta$ has the value 1, Equations 9A–9D are identical to Equations 1A–1D, and hence the variant cost function E' is identical to the cost function E given in Equation 6. When $\beta$ has the value 0, the variant cost function E' is a linearization of the cost function E given in Equation 6. As mentioned above, the convergence of the sequence of surfaces can be enhanced by using the variant cost function E' where $\beta$ has a value between 0 and 1, including 0 but excluding 1, for one or more steps in the iteration, before returning to the original problem. It will also be appreciated that when $\beta$ has a value other than 1, $\kappa_1'$ and $\kappa_2'$ lose their geometric significance.

It will be appreciated that the surface calculation described hereinabove can be used to calculate a single unknown surface of any optical element, which might consist of several refracting surfaces.

According to a preferred embodiment of the present invention, the parameters specified in step 100 of FIG. 1, adjusted in step 108, and used in the calculation of step 102, are the partition of D into triangles $\tau_i$, the desired optical power function P(x,y), the weight coefficients $w_{i,1}$ and $w_{i,2}$, the curves $C_m$ and the curve constraints.

Furthermore, as mentioned hereinabove with respect to step 104 of FIG. 1, once the lens surface f has been calculated, the designer checks surface properties of the calculated surface and simulates optical properties of the lens as a whole. The surface properties checked include the surface optical power, the surface astigmatism, and the gradients of the surface optical power and surface astigmatism. For example, the surface astigmatism of the calculated larly shown and described herein above. Rather the scope of the invention is defined by the claims that follow:

What is claimed is:

1. A method for designing a surface of a multifocal optical element, the method comprising the steps of:
    partitioning a region into triangles;
    defining a set of functions, each of which represents a portion of said surface over one of said triangles; and
    optimizing said functions, thereby generating said surface.

2. A method according to claim 1, wherein said optical element is a lens.

3. A method according to claim 2, wherein said lens is a progressive spectacle lens.

4. A method according to claim 1, wherein said region is a two-dimensional region and wherein said functions are fifth-order polynomials in said two dimensions.

5. A method according to claim 1, further comprising the steps of:
    simulating optical behavior of said optical element based upon said generated surface; and
    if said generated surface is unsatisfactory, adjusting parameter values of said functions and repeating said steps of optimizing and simulating.

6. A method according to claim 1, wherein said step of optimizing further comprises the steps of:
    defining a function of said set of functions; and
    optimizing said function.

7. A method according to claim 6, wherein said function is a cost function and said step of optimizing said function is the step of minimizing said function.

8. A method according to claim 6, further comprising the step of:

choosing weights to be included in said function.

9. A method according to claim 8, wherein said weights vary according to at least one of location on said surface, said set of functions and first derivatives of said set of functions.

10. A method for designing a surface of a multifocal optical element, the method comprising the steps of:

partitioning a region into polygons;

defining a set of functions, each of which represents a portion of said surface over one of said polygons;

dictating continuity constraints for values of said functions and values of the first derivatives of said functions at boundaries of said polygons;

not requiring continuity constraints for values of the second derivatives of said functions at boundaries of said polygons; and optimizing said functions subject to said dictated continuity constraints, thereby generating said surface.

11. A method according to claim 10, wherein said optical element is a lens.

12. A method according to claim 11, wherein said lens is a progressive spectacle lens.

13. A method according to claim 10, the method further comprising the step of:

dictating continuity constraints for values of the second derivatives of said functions at vertices of said polygons.

14. A method according to claim 10, wherein said polygons are triangles.

15. A method according to claim 14, wherein said region is a two-dimensional region and wherein said functions are fifth-order polynomials in said two dimensions.

16. A method according to claim 10, further comprising the steps of:

simulating optical behavior of said optical element based upon said generated surface; and if said generated surface is unsatisfactory, adjusting parameter values of said functions and repeating said steps of optimizing and simulating.

17. A method according to claim 10, wherein said step of optimizing further comprises the steps of:

defining a function of said set of functions; and optimizing said function.

18. A method according to claim 17, wherein said function is a cost function and said step of optimizing said function is the step of minimizing said function.

19. A method according to claim 17, further comprising the step of:

choosing weights to be included in said function.

20. A method according to claim 19, wherein said weights vary according to at least one of location on said surface, said set of functions and first derivatives of said set of functions.

21. A method for designing a surface of a multifocal optical element, the method comprising the steps of:

partitioning a region into polygons;

defining a set of functions, each of which represents a portion of said surface over one of said polygons;

determining a plurality of curves along a subset of boundaries of said polygons;

prescribing values of at least one of the set comprising said functions, first derivatives of said functions and second derivatives of said functions, or any combination therefrom, at selected vertices of polygons coincident with said plurality of curves; and optimizing said functions subject to said prescribed values, thereby generating said surface.

22. A method according to claim 21, wherein said optical element is a lens.

23. A method according to claim 22, wherein said lens is a progressive spectacle lens.

24. A method according to claim 21, wherein said polygons are triangles.

25. A method according to claim 21, wherein said polygons are rectangles.

26. A method according to claim 24, wherein said region is a two-dimensional region and wherein said functions are fifth-order polynomials in said two dimensions.

27. A method according to claim 21, further comprising the steps of:

simulating optical behavior of said optical element based upon said generated surface; and if said generated surface is unsatisfactory, adjusting parameter values of said functions and repeating said steps of optimizing and simulating.

28. A method according to claim 21, wherein said step of optimizing further comprises the steps of:

defining a function of said set of functions; and optimizing said function.

29. A method according to claim 28, wherein said function is a cost function and said step of optimizing said function is the step of minimizing said function.

30. A method according to claim 28, further comprising the step of:

choosing weights to be included in said function.

31. A method according to claim 30, wherein said weights vary according to at least one of location on said surface, said set of functions and first derivatives of said set of functions.

32. A multifocal optical element having a plurality of surfaces, wherein at least one of said surfaces is designed by the method according to claim 1.

33. A multifocal optical element having a plurality of surfaces, wherein at least one of said surfaces is designed by the method according to claim 10.

34. A multifocal optical element having a plurality of surfaces, wherein at least one of said surfaces is designed by the method according to claim 21.

* * * * *